United States Patent
Gaur

(10) Patent No.: US 7,032,035 B2
(45) Date of Patent: Apr. 18, 2006

(54) METHOD AND APPARATUS FOR IMPROVING TRANSMISSION PERFORMANCE BY CACHING FREQUENTLY-USED PACKET HEADERS

(75) Inventor: Daniel R. Gaur, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 955 days.

(21) Appl. No.: 09/733,246

(22) Filed: Dec. 8, 2000

(65) Prior Publication Data

US 2002/0073216 A1    Jun. 13, 2002

(51) Int. Cl.
*G06F 13/00* (2006.01)

(52) U.S. Cl. ..................................... 709/250
(58) Field of Classification Search ............. 711/718; 709/250; 370/230
See application file for complete search history.

(56) References Cited

U.S. PATENT DOCUMENTS

| | | | | |
|---|---|---|---|---|
| 5,978,951 A | * | 11/1999 | Lawler et al. | 714/758 |
| 6,003,106 A | * | 12/1999 | Fields et al. | 710/308 |
| 6,182,193 B1 | * | 1/2001 | Hamami | 711/119 |
| 6,230,241 B1 | * | 5/2001 | McKenney | 711/118 |
| 6,279,097 B1 | * | 8/2001 | Kaku | 711/216 |
| 6,401,171 B1 | * | 6/2002 | Klein et al. | 711/118 |
| 6,678,803 B1 | * | 1/2004 | LaBerge | 711/154 |
| 6,683,885 B1 | * | 1/2004 | Sugai et al. | 370/423 |
| 6,717,913 B1 | * | 4/2004 | Ghahremani et al. | 370/230 |
| 6,731,644 B1 | * | 5/2004 | Epps et al. | 370/412 |
| 6,772,295 B1 | * | 8/2004 | Spencer et al. | 711/137 |

FOREIGN PATENT DOCUMENTS

WO    9219058 A1 * 10/1992

* cited by examiner

*Primary Examiner*—Dung Dinh
(74) *Attorney, Agent, or Firm*—Glen B. Choi

(57) ABSTRACT

In some embodiments, a method is provided for transmitting packet headers in a network adapter across a network. In this embodiment memory protocol headers and application data into packet buffers are stored on a host. On the network adapter a MAC header storing in a cache. The stored packet buffers and stored MAC header are transmitted across a network thereby reducing DMA requests.

28 Claims, 4 Drawing Sheets

METHOD AND APPARATUS FOR IMPROVING TRANSMISSION PERFORMANCE BY CACHING FREQUENTLY-USED PACKET HEADERS

BACKGROUND OF THE INVENTION

1. Field

The present invention relates generally to increasing the performance of a multi-layer network protocol stack transmission by caching packet headers in a network adapter. More specifically this invention relates to increasing transmission and system performance by internally caching commonly used headers to allow the network adapter (and specifically Ethernet adapters) to reduce the number of DMA accesses required for each packet.

2. Description

A typical Ethernet network has an Ethernet device connected on a processor bus in a host personal computer (PC). The Ethernet device transmits data-packets provided by the PC to another host on an Ethernet network. The data packets typically have a series of disjoint "packet buffers" each of which contains a portion of data. A typical Ethernet packet involves three packet buffers, one for the MAC (media access control) header, one for the upper-layer protocol (e.g. TCP/IP or IPX) header, and one for the actual application data. Using different packet types and different protocols may result in different allocations of the packet data size in the Ethernet packet. Before transmission, the network adapter device driver must individually DMA each one of these buffers in order to transmit the complete data packet.

This approach could cause inefficiencies resulting in processor expending extra-bus cycles to transfer data. Most hosts directly communicate with relatively few other hosts on the network; instead, most communication occurs indirectly through intermediate hosts (i.e, routers). Although application data and some protocol headers may change on a packet-by-packet basis, the vast majority of packets will use a relatively small number of unique MAC headers since most packets are forwarded to one of these routers. Consequently, the upper layers of the protocol stack are repeatedly filling these identical MAC headers into a packet. Likewise, the network adapter is repeatedly and needlessly DMA accessing these same MAC headers on each packet transmission.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
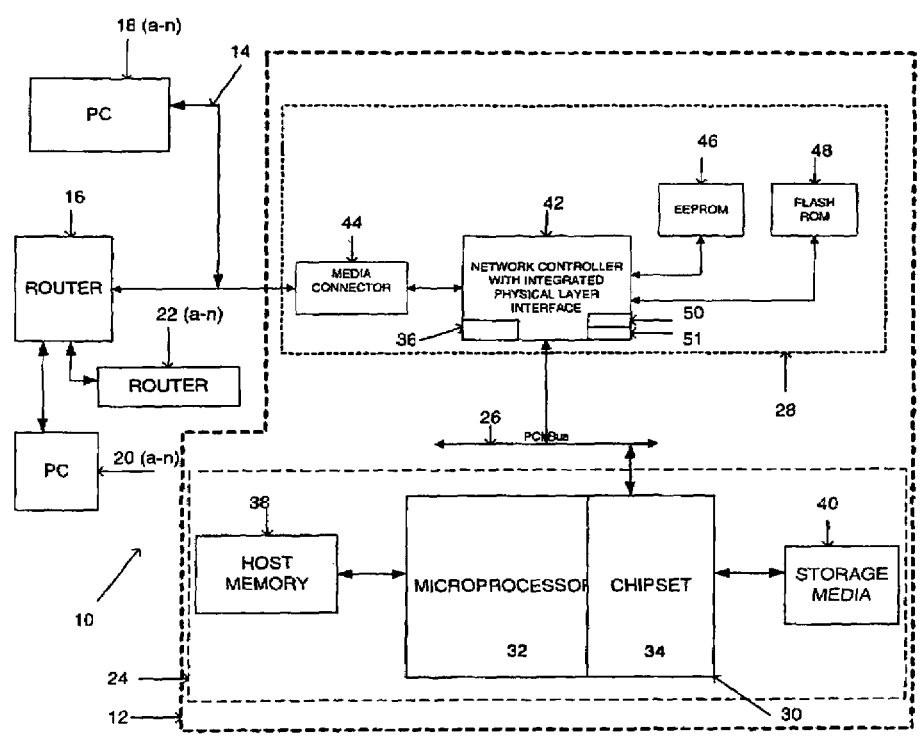
FIG. 1 is a schematic diagram of a network having a host computer and router connected to other connected network devices.

Referring to FIG. 1, there is shown an Ethernet network 10 having a personal computer (PC) 12 connected through network line 14 or network to Router or switch 16 and PC's 18(a–n). PC 12 is coupled through Router 16 to PC's 20(a–n) or other Routers or switches 22(a–n).

PC 12 has a computer module 24 connected through bus 26 to network controller module 28. Computer module 24 typically includes a control circuit 30 that has a microprocessor 32 and chipset 34. Module 24 may contain an onboard DMA controller (not shown). An example microprocessor 32 and chipset 34 include those manufactured by Intel Corporation such as the Pentium® microprocessors and 440Bx chipsets. Control circuit 30 reads and writes data and reads instructions from a host memory 38 that is typically a high-speed volatile memory, such as DRAM or SRAM. Control Circuit 30 also reads and writes to storage media 40 that contains other application information including microprocessor instructions and operating systems programs.

Controller module 28 includes a network controller 42 coupled through a media connector 44 to network line 14. Network controller 42, is preferably coupled to a non-volatile memory such as an EEPROM 46 and electrically programmable memory 48. EEPROM 46 holds static configurations of network controller 42. Flash Ram 48 allows network controller 28 to operate independently of control circuit 30. Network line 14 is typically a physical network medium such as a CAT5 or fiber cable that handles 10 or 100 or 1000 Base TX signals. Network controller module 42 is preferably an Ethernet network controller with an integrated physical interface. Network controller module 42 are known in the an, but the network controller in accordance with the one embodiment, includes additional features described in blocks 120, 124 and 126 that will be discussed in more detail later in connection with FIG. 4.

Controller module 42 preferably contains an internal memory element, or external memory element hereafter referred to as cache 50 and a DMA controller 36. Module 42 also has an internal memory such as a FIFO 51 to store incoming and outgoing packets or alternately may use cache 50 to function as a FIFO. DMA controller 36 can perform direct memory access functionality to transfer multiple fragments of a packet from host memory 38 into its internal cache prior to transmission. Also, in accordance with the one embodiment, module 42 uses cache 50 for storing copies of tag 82 and headers 54 or 56 or data 58.

Controller module 42 receives commands and data from computer module 24 through bus 26. Bus 26 is preferably a PCI bus, but could be any bus that permits address and data to be transferred between module 24 and module 28. Data in host memory 38 is typically transferred to module 42 using a DMA controller 36 or read/write instructions of microprocessor 32.

Figure 2:
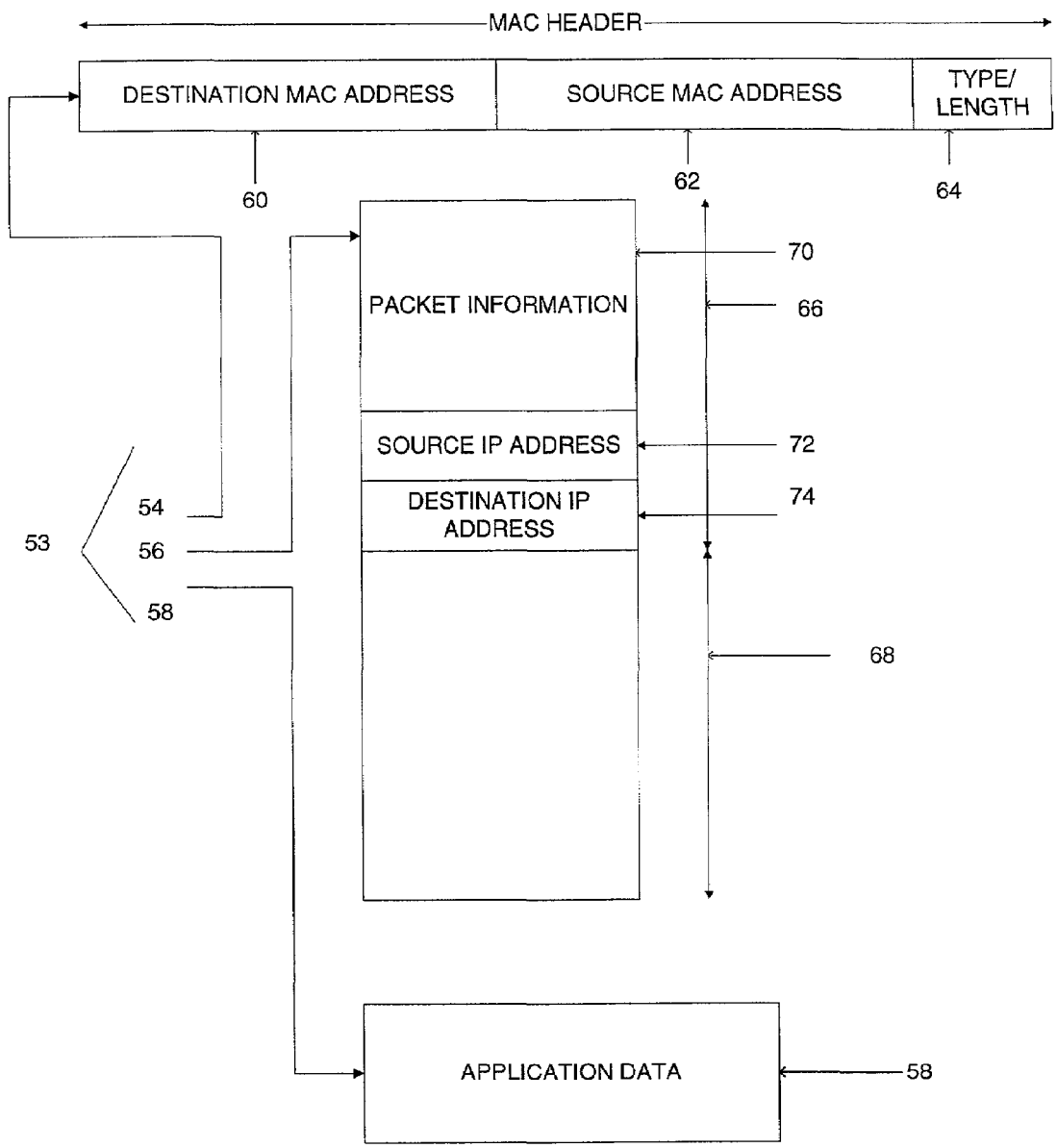
FIG. 2 is a chart showing the format of the headers being transmitted in an Ethernet packet.

Network controller 42 transmits and receives packet information 53 (FIG. 2) on line 14 through media connector 44. Referring to FIG. 2, when such packet information 53 is an Ethernet TCP/IP packet, such packet information 53 includes packet buffers respectively having a MAC Header 54, a TCP/IP header 56 and application data 58. Application data 58 is the information being transmitted or received from the host and has an arbitrary length.

MAC header 54 typically includes a destination Mac address 60, source MAC address 62 and type field 64 for a total of 64 bytes. The length of MAC header 54 is typically 14 bytes (six for destination address 60, six for the source address 62 and two for the type field 64). MAC address 60 typically remains static when the PC 10 repeatedly transmits packet information 53 to the same router.

TCP/IP header 56 includes a twenty byte IP header 66 and a twenty byte TCP header 68. IP header 66 has a packet information field 70, a source IP address field 72 and destination IP address field 74. TCP header 56 contains source and destination port information, sequence and acknowledgement information, header, window size, and checksum information.

Figure 3:
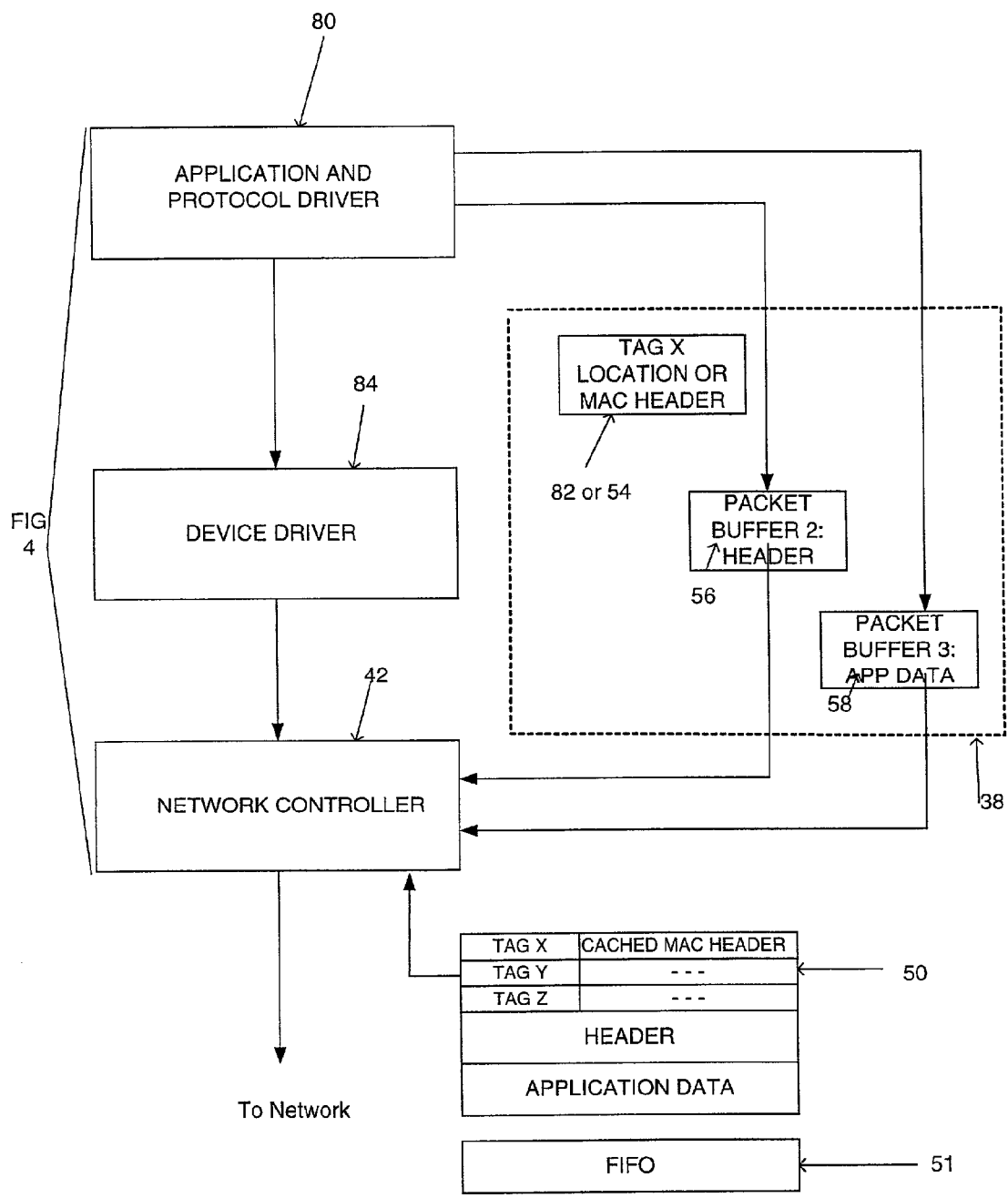
FIG. 3 is a simplified flow diagram showing the protocol in which a data packet is transmitted in accordance with the on embodiment.

Referring to FIG. 3, there is shown a protocol flow in accordance with the one embodiment having an application and protocol driver 80 communicating to a device driver 84 and controller 42. In the protocol flow, the application and protocol driver 80 stores in one memory location in host memory 38 a packet buffer containing the TCP/IP packet header 56 and stores in host memory 38 at a second location application data 58. If the MAC address had not changed since the last transmission by the protocol driver 80 of packet information 83, a tag location 82 corresponding to a location in cache 50 is stored in host memory 38. Driver 80 also stores header 56 and data 58 in memory 38. If MAC header has changed then the new MAC header 54 is stored in host memory 38.

Once the MAC header 54 and application data 58 have been stored in host memory 38, driver 80 indicates to the device driver 84 to send packet information 53. Device driver 84 then delivers to controller 42 on module 28 the location of where packet buffers (tag 82, header 56 and data 58) are stored in host memory 38. Controller 42 writes the value in tag location 82 into the packet 53 but if MAC header 54 is new, then header 54 is transferred using DMA to controller 36 in controller 42 for transmission with packet 53.

Controller 42 than responds to the transferred information by assembling the complete network packet information 53 and loading the information 53 into FIFO 51 to transmit onto the network 14. The assembled packet includes the header 54 at the location in internal cache 86 indicated by tag 82, e.g. tag 86x, followed by header 56 and data 58. Controller 42 only needs to DMA the information containing volatile (i.e., uncached) data and saves DMA operations of every cached header that it inserts.

Figure 4:
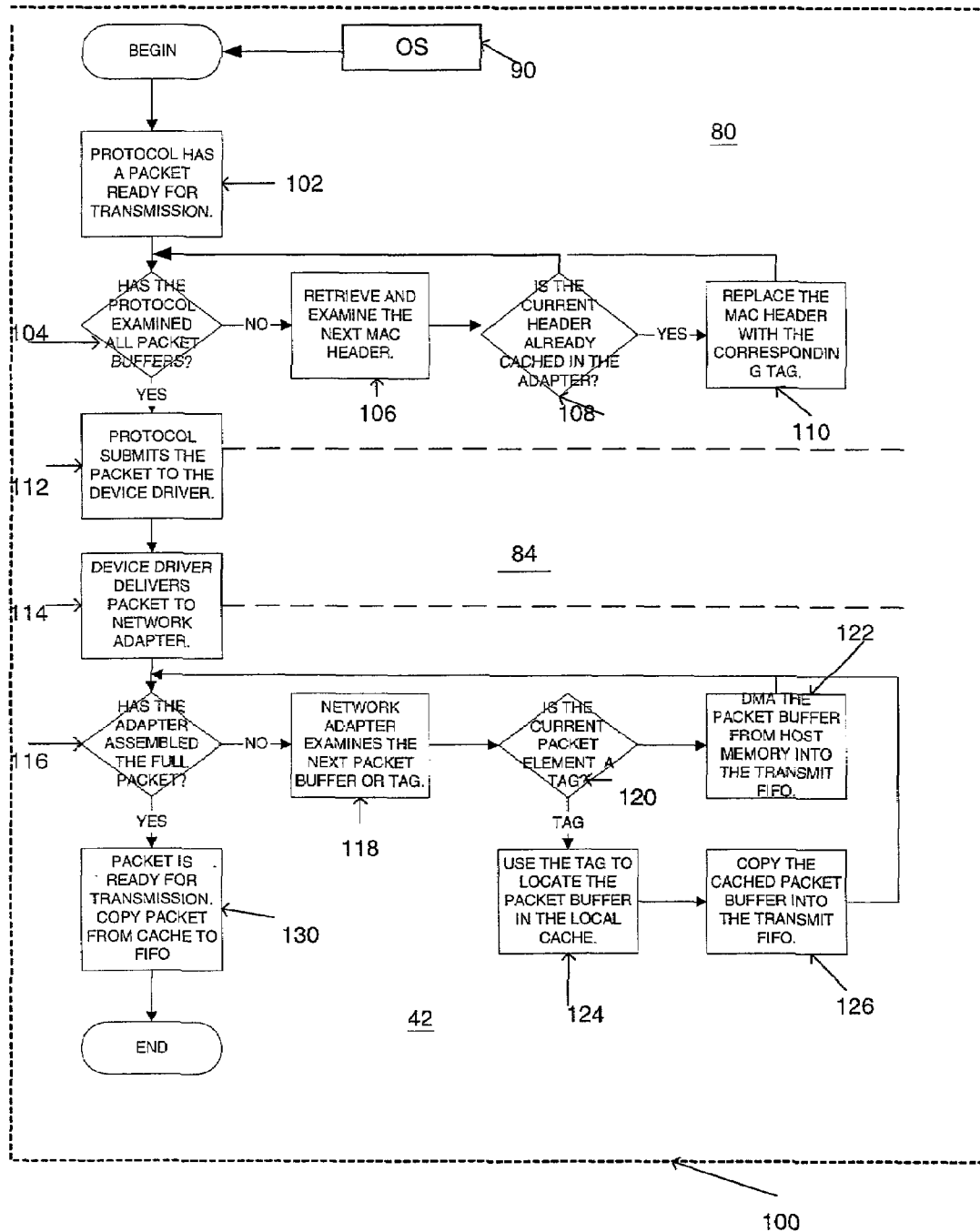
FIG. 4 is a flow diagram of the device driver shown in FIG. 3.

Referring to FIG. 4, there is shown Operating System 90 communicating to application and protocol driver 80 through device driver 84 to network controller 42. The protocol driver 80 is typically activated on a command from an OS 90. The OS 90 sends an indication to driver 80 to send MAC header 54 and application data 58 and packet headers 56 on to network 14.

Protocol driver 80 in block 102 starts a process for transmitting packet 53. Driver 82 in block 104 determines if the MAC headers 54 have been examined. Optionally driver 80 could determine if header 56 or data 58 has been examined. If it has not, the next MAC header 54 (or alternatively packet buffer) is retrieved and examined in block 106. Then in block 108 driver 80 determines if the current MAC header 54 (or other packet buffer) under examination has already been stored in cache 50 in controller 42. If it has, it replaces the MAC header 54 (or packet buffer) with the corresponding tag location 82 in block 110. If it has not, block 104 is executed with a true result in block 104 and passing to block 112.

Once the MAC header 54 (or other packet buffers) has been examined in block 104, the controller 42 in block 112 indicates to the driver 84 to submit the packet 53 to controller 42 in block 112. The driver 84 in block 114 indicates to controller 42 that a packet is ready for transmission onto the network.

Blocks 116 through 130 are executed by an internal state-machine within controller 42. In block 116 if controller 42 determines if it has assembled a full packet for transmission. If it has not, controller 42 examines the next packet header 54 or 56 or application data 58 or tag location 82 located in memory 38 in block 118. The controller 42 in block 120 determines if the header 54 under examination is a full MAC header 54, a tag location 82, header 56 or data 58. If it is a MAC header 54, or header 56 or data 58, in block 122 an indication is provided to DMA controller 36 to DMA MAC header 54, header 56 or data 58 respectively from host memory 38 to cache 50 in controller 42. If the packet under examination is a tag, the tag 82 indicates a location in cache 50 of header 54 in block 124. In block 126 controller 42 sets a flag to indicate, to controller 42 on packet transmission (Block 130), the location in cache 50 specified by tag 82 to be copied into the transmit FIFO 51.

After block 122 and block 126 are executed, controller 42 re-executes block 116. If the controller 42 has assembled a full packet for transmission, controller 42 in block 130 determines is a flag (from block 126) is set, and if so sends the assembled packet onto the network by copying the cached MAC header 54, DMA header 56 and DMA data 58 into transmit FIFO 51. Controller 42 then places info into FIFO 51 for transmission onto network 14.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A method for transmitting packet headers in a network adapter across a network comprising:

storing in a host memory protocol headers and application data into packet buffers;

storing in a cache on the network adapter at least one MAC header; and transmitting the stored protocol headers and application data and a selected MAC header across a network, wherein the transmitting includes selectively retrieving the selected MAC header from the cache or the host memory based, in part, on whether the selected MAC header was previously transmitted.

2. The method as recited in claim 1 further comprising:
   storing in the host memory a tag indicating a location of the selected MAC header in the cache;
   retrieving the tag; and wherein the transmitting includes accessing the selected MAC header at the location in the cache indicated by the tag.

3. The method as recited in claim 1, wherein the host memory is on a personal computer and further comprising:
   storing the protocol headers and application data in the host memory on the personal computer; and
   passing the selected protocol headers and application data to the network adapter using a direct memory access controller that retrieves data and headers from the host memory on the personal computer and writes the retrieved data and headers in the network adapter.

4. The method as recited in claim 3 further comprising:
   determining if a MAC header is different from a MAC header previously transmitted; and
   storing the MAC header in the host memory if the MAC header is different from the MAC header previously transmitted.

5. The method as recited in claim 4 further comprising, passing the MAC header in the host memory using the direct memory access controller and writing the passed MAC header in the network adapter.

6. The method as recited in claim 1 further comprising receiving the protocol headers, application data and MAC header from an operating system.

7. The method as recited in claim 3 further comprising:
   storing a MAC header into the cache on the network adapter using a processor writing the MAC header over a personal computer bus into the cache located on the network adapter; and
   passing the protocol headers and application data using a direct memory access controller located on the personal computer bus.

8. The method of claim 1, wherein the retrieving comprises retrieving the selected MAC header from the cache if the selected MAC header has been previously transmitted and retrieving the selected MAC header from the host memory if the selected MAC header has not been previously transmitted.

9. A computer system capable of transmitting packet headers across a network comprising:
   a processor and a host memory, wherein the host memory is to store protocol headers and application data into packet buffers;
   a network adapter having a local cache capable to store at least one MAC header;
   a DMA controller operative to pass the stored protocol headers and application data from the host memory to said network adapter; and
   said network adapter being operative to transmit both the stored protocol headers and application data passed by the DMA controller and a selected MAC header across a network, wherein said network adapter selectively retrieves the selected MAC header from the local cache or the host memory based, in part, on whether the selected MAC header has been previously transmitted.

10. The computer system as recited in claim 9 wherein said processor is operative to store in the host memory a tag indicating a location of the selected MAC header in the local cache and operative to retrieve the tag from host memory and pass the tag to the network adapter; and wherein said network adapter is responsive to the tag being passed by the processor to access the selected MAC header at the location indicated by the tag when transmitting the selected MAC header across a network.

11. The computer system as recited in claim 10 further comprising:
    a personal computer having the host memory to store the protocol headers and application data; and
    a direct memory access controller to pass the host memory protocol headers and application data to the network adapter from the host memory and to write the passed headers and data in the network adapter.

12. The computer system of claim 9, wherein said network adapter retrieves the selected MAC header from the local cache if the selected MAC header has been previously transmitted and retrieves the selected MAC header from the host memory if the selected MAC header has not been previously transmitted.

13. An article comprising:
    storage medium having a plurality of instructions, which when executed by a
    processor, cause transmission of packets by:
      storing protocol headers and application data into packet buffers in a host memory;
      storing in a cache on a network adapter at least one MAC header; and
      transmitting the stored protocol headers and application data and a selected MAC header across a network, wherein the selected MAC header is selectively retrieved from the cache or the host memory based, in part, on whether the selected MAC header has been previously transmitted.

14. The article as recited in claim 13 further comprising instructions to store in the host memory a tag indicating a location of the selected MAC header in the cache; retrieve the tag; and wherein the instruction causing transmission of packets by transmitting the stored protocol headers and application data and a selected MAC header across a network includes instructions to access the selected MAC header at the location in the cache indicated by the tag.

15. The article as recited in claim 13 further comprising instructions to:
    store the protocol headers and application data in the host memory on a personal computer; and
    pass the host memory protocol headers and application data to the network adapter using a direct memory access controller that retrieves data and headers from the host memory and writes the retrieved data in the network adapter.

16. The article as recited in claim 15 further comprising instructions to:
    determine if a MAC header is different from a MAC header previously transmitted; and
    store the MAC header in the host memory if the MAC header is different from the MAC header previously transmitted.

17. The article as recited in claim 16 further comprising instructions to pass the MAC header in host memory using the direct memory access controller and write the retrieved MAC header in the network adapter.

18. The article as recited in claim 13 further comprising instructions to receive the protocol headers, application data and MAC header from an operating system.

19. The article as recited in claim 15 further comprising instructions to:
   store a MAC header into the cache on the network adapter using a processor writing the MAC header over a personal computer bus into the cache located on the network adapter; and
   pass the protocol headers and application data using a direct memory access controller located on the personal computer bus.

20. The article of claim 13, wherein the instructions, which when executed by a processor, cause transmission of packets by transmitting the stored protocol headers and application data and a selected MAC header across a network comprises instructions to retrieve the selected MAC header from the cache if the selected MAC header has been previously transmitted and to retrieve the selected MAC header from the host memory if the selected MAC header has not been previously transmitted.

21. An adapter apparatus for transmitting packet headers, stored in a host memory of a computer as a protocol header and application data, across a network comprising:
   a network controller having a cache to store at least one MAC header, said network controller transmitting the stored protocol header and application data and a selected MAC header across a network, wherein the transmitting includes selectively retrieving the selected MAC header from the cache or the host memory based, in part, on whether the selected MAC header has been previously transmitted.

22. The adapter apparatus as recited in claim 21 wherein said network controller retrieves a tag from host memory, wherein the tag indicates the location of the selected MAC header in the cache; and wherein said network controller accesses the selected MAC header at the location indicated by the tag to transmit the MAC header across the network.

23. The adapter apparatus as recited in claim 21 further comprising a direct memory access controller to retrieve the host memory protocol headers and application data and to write the retrieved headers and data in the network controller.

24. The adapter apparatus as recited in claim 23 wherein the network controller determines if a MAC header is different from a MAC header previously transmitted and stores the MAC header in the host memory if the MAC header is different from the MAC header previously transmitted.

25. The adapter apparatus of claim 21, wherein the network controller is to retrieve the selected MAC header from the cache if the selected MAC header has been previously transmitted and to retrieve the selected MAC header from the host memory if the selected MAC header has not been previously transmitted.

26. A system comprising:
   a host system comprising:
      a processor, and
      a host memory to store protocol headers and application data into packet buffers;
   a network adapter comprising:
      a local cache capable to store at least one MAC header, and
      logic to transfer the stored protocol headers and application data from the host memory to said network adapter, wherein said network adapter is operative to transmit both the stored protocol headers and application data passed by the logic to transfer and a selected MAC header across a network and wherein said network adapter selectively retrieves the selected MAC header from the local cache or the host memory based, in part, on whether the selected MAC header has been previously transmitted; and
   a bus to communicatively couple the network adapter with the host system.

27. The system of claim 26, wherein the network adapter includes logic to retrieve the selected MAC header from the cache if the selected MAC header has been previously transmitted and to retrieve the selected MAC header from the host memory if the selected MAC header has not been previously transmitted.

28. The system of claim 26, further comprising a router communicatively coupled to the network adapter.

* * * * *